(12) United States Patent
Yan et al.

(10) Patent No.: US 10,809,824 B2
(45) Date of Patent: Oct. 20, 2020

(54) INFORMATION PROCESSING METHOD AND ELECTRONIC DEVICE

(71) Applicant: Lenovo (Beijing) Limited, Beijing (CN)

(72) Inventors: Wenlin Yan, Beijing (CN); Xi Wan, Beijing (CN); Jie Xia, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 303 days.

(21) Appl. No.: 15/396,400

(22) Filed: Dec. 30, 2016

(65) Prior Publication Data

US 2017/0192532 A1    Jul. 6, 2017

(30) Foreign Application Priority Data

Dec. 31, 2015   (CN) .......................... 2015 1 1031398
Dec. 31, 2015   (CN) .......................... 2015 1 1034190

(51) Int. Cl.
*G06F 3/0362*     (2013.01)
*G06F 3/0338*     (2013.01)
(Continued)

(52) U.S. Cl.
CPC .......... *G06F 3/0362* (2013.01); *G06F 3/0338* (2013.01); *G06F 3/041* (2013.01);
(Continued)

(58) Field of Classification Search
CPC .... G06F 3/0304; G06F 3/0312; G06F 3/0317; G06F 3/0321; G06F 3/033; G06F 3/0338; G06F 3/0354; G06F 3/03548; G06F 3/0362; G06F 3/038; G06F 3/041; G06F 3/044; G06F 3/04817; G06F 3/0482; G06F 3/04847; G06F 3/0487; G06F 2203/0381;
(Continued)

(56) References Cited

U.S. PATENT DOCUMENTS

| 8,195,313 | B1* | 6/2012 | Fadell | G06F 3/0362 700/83 |
| 2008/0259025 | A1* | 10/2008 | Eom | G06F 3/03549 345/156 |
| 2013/0027294 | A1* | 1/2013 | Nakagawa | G06F 3/0338 345/156 |
| 2013/0135243 | A1* | 5/2013 | Hirsch | H01H 13/83 345/173 |

(Continued)

FOREIGN PATENT DOCUMENTS

| CN | 1463460 A | 12/2003 |
| CN | 1841273 A | 10/2006 |

(Continued)

*Primary Examiner* — Nathan Danielsen
(74) *Attorney, Agent, or Firm* — Ference & Associates LLC

(57) ABSTRACT

One embodiment provides an electronic device, including a first main body; a second main body being moveable relative to the first main body; a first sensing apparatus that obtains a first parameter in response to the second main body moving relative to the first main body to satisfy a first condition; a second sensing apparatus that obtains a second parameter in response to the first or the second main body receiving a second operation satisfying a second condition; and a processing apparatus that provides an instruction in response to one or more of the first condition being satisfied and the second condition being satisfied. Other aspects are described and claimed.

10 Claims, 11 Drawing Sheets

--- a first sensor obtains a first parameter indicating a rotation angle caused by the first operation, and a second sensor obtains a second parameter indicating an external force applied by the first operation     301 if the first parameter reaches a first threshold and the second parameter fails to reach a second threshold, generate the first instruction; if the first parameter fails to reach the first threshold and the second parameter reaches the second threshold, generate the second instruction; and if the first parameter reaches the first threshold and the second parameter reaches the second threshold, generate a third instruction     302

(51) Int. Cl.
*G06F 3/0487* (2013.01)
*H04L 12/28* (2006.01)
*G06F 3/0482* (2013.01)
*G06F 3/0484* (2013.01)
*G06F 3/041* (2006.01)

(52) U.S. Cl.
CPC .......... *G06F 3/0482* (2013.01); *G06F 3/0487* (2013.01); *G06F 3/04847* (2013.01); *H04L 12/282* (2013.01); *H04L 12/283* (2013.01); *G06F 2203/04105* (2013.01); *H04L 2012/2849* (2013.01)

(58) Field of Classification Search
CPC ............... F24F 11/30; F24F 11/52–526; F24F 11/62–67; F24F 11/70; F24F 11/88; F24F 11/89; F24F 13/20; F24F 2013/202–207; H04L 12/2803; H04L 12/2814; H04L 12/2816; H04L 12/282; H04L 12/2823; H04L 12/2827; H04L 12/283; H04L 12/2832; H04L 2012/2847–285
See application file for complete search history.

(56) References Cited

U.S. PATENT DOCUMENTS

| | | | | |
|---|---|---|---|---|
| 2014/0025209 | A1* | 1/2014 | Lunacek | G05D 23/1902 700/276 |
| 2014/0049703 | A1* | 2/2014 | Hu | G06F 3/03545 349/12 |
| 2015/0163945 | A1* | 6/2015 | Barton | F24F 11/30 361/809 |
| 2016/0307439 | A1* | 10/2016 | Selfe | G08C 17/02 |
| 2017/0102723 | A1* | 4/2017 | Smith | H04L 12/6418 |

FOREIGN PATENT DOCUMENTS

| | | |
|---|---|---|
| CN | 101112083 A | 1/2008 |
| CN | 101635060 A | 1/2010 |
| CN | 103440752 A | 12/2013 |
| CN | 103984473 A | 8/2014 |
| CN | 204808250 U | 11/2015 |
| CN | 204856451 U | 12/2015 |
| EP | 0451872 A2 | 10/1991 |

* cited by examiner

INFORMATION PROCESSING METHOD AND ELECTRONIC DEVICE

CLAIM FOR PRIORITY

This application claims priority to Chinese Application Nos. 201511034190.X and 201511031398.6, filed on Dec. 31, 2015, the contents of which are fully incorporated by reference herein.

FIELD

The subject matter described herein relates to the technologies of information processing, and in particular, to an information processing method and an electronic device.

BACKGROUND

Operations of a smartphone or a tablet computer PAD usually include touch, slide, a predetermined number of taps, and the like, for example, entering into a desktop interface from a black screen by using a slide operation, entering to an alarm clock application setting interface from an application display interface by using a tab operation performed on an alarm clock application, and returning to a desktop interface from a browser interface by touching a Home key. These gestures are relatively simple, and because so, misoperation and error response would be more likely to occur. Electronic devices supporting more complex gestures such as rotatable functions and press functions (with increased misoperations) are becoming more and more popular.

BRIEF SUMMARY

In summary, one aspect provides an electronic device, comprising: a first main body; a second main body being moveable relative to the first main body; a first sensing apparatus that obtains a first parameter in response to the second main body moving relative to the first main body to satisfy a first condition; a second sensing apparatus that obtains a second parameter in response to the first or the second main body receiving a second operation satisfying a second condition; and a processing apparatus that provides an instruction in response to one or more of the first condition being satisfied and the second condition being satisfied.

Another aspect provides a method, comprising: obtaining, with a first sensing apparatus, a first parameter in response to a first main body of a device moving relative to a second main body of the device to satisfy a first condition; obtaining, with a second sensing apparatus, a second parameter in response to the first or the second main body receiving a second operation satisfying a second condition; and providing, with a processing apparatus, an instruction in response to one or more of the first condition being satisfied and the second condition being satisfied.

A further aspect provides a control device, comprising: an electronic device, comprising: a first main body; a second main body being moveable relative to the first main body; a first sensing apparatus that obtains a first parameter in response to the second main body moving relative to the first main body to satisfy a first condition; a second sensing apparatus that obtains a second parameter in response to the first or the second main body receiving a second operation satisfying a second condition; and a processing apparatus that provides an instruction in response to one or more of the first condition being satisfied and the second condition being satisfied; the control device further providing the instruction to another device to alter an operating state of the another device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment of an information processing method according to the present invention is applied to an electronic device. The electronic device is a device supporting a rotatable function and a press function.

Figure 1:
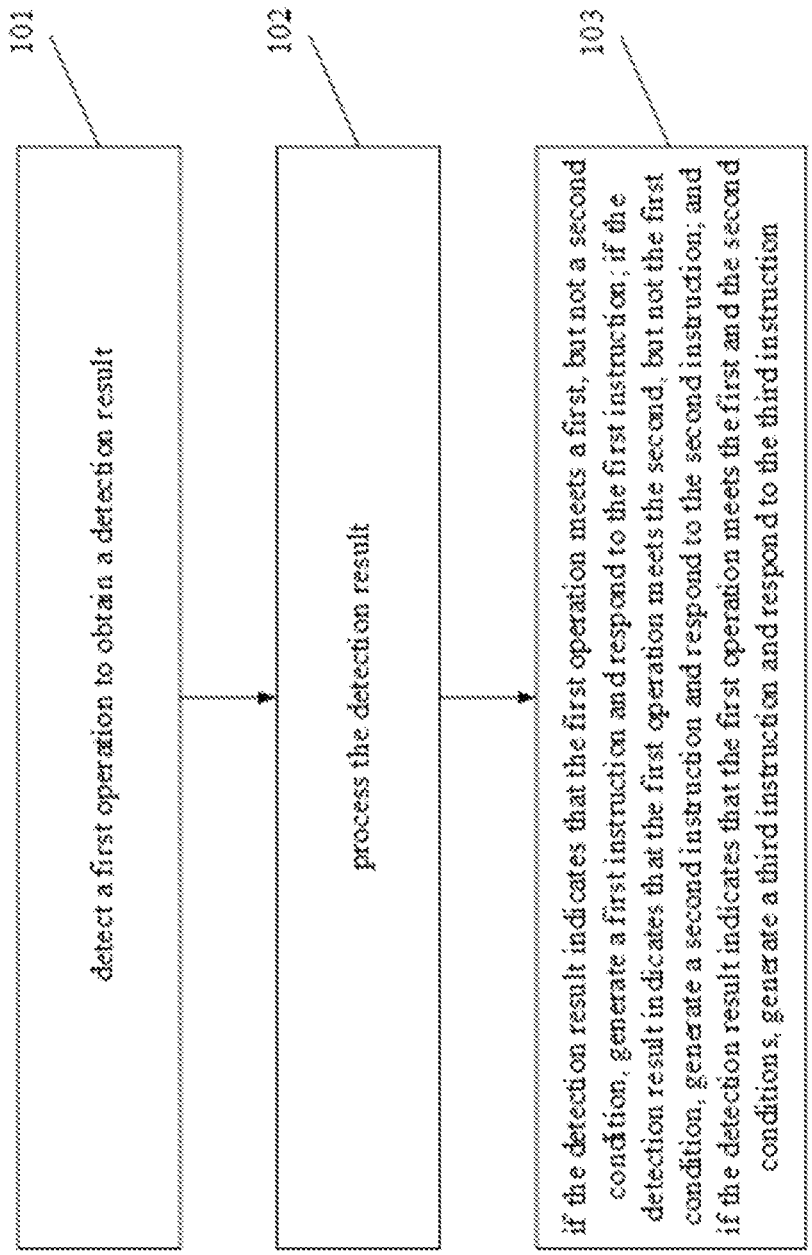
FIG. 1 is a schematic flow diagram of implementation of an exemplary embodiment of an information processing method.

FIG. 1 is a schematic flow diagram showing implementation of an embodiment of an information processing method according to the present invention. As shown in FIG. 1, the method includes:

Step 101: Detect a first operation to obtain a detection result. Herein, the electronic device detects an operation, for example, an operation performed on the electronic device by a user.

Step 102: Process the detection result. Herein, the detection result of the first operation is processed.

Step 103: If the detection result indicates that the first operation meets a first, but not a second condition, generate a first instruction and respond to the first instruction; if the detection result indicates that the first operation meets the second, but not the first condition, generate a second instruction and respond to the second instruction; and if the detection result indicates that the first operation meets the first and the second conditions, generate a third instruction and respond to the third instruction.

Herein, with regard to the electronic device supporting a rotatable function and a press function, this embodiment is used to classify whether the first operation is a rotation operation, a press operation, or a rotation and press operation. If the first condition is a condition that a rotation operation meets, and the second condition is a condition that a press operation meets, when a first resolution result meets the first condition, but not the second condition, an instruction is generated based on a rotation operation (a rotation instruction), and the instruction is responded; when the first resolution result meets the second condition, but not the first condition, an instruction is generated based on a press operation (a press instruction), and the instruction is responded; and when the first resolution result simultaneously meets the first and the second conditions, an instruction is generated based on a rotation operation and a press operation (a rotation and press instruction), and the instruction is responded. Certainly, the first condition may further be a condition that a press operation meets, and accordingly, the second condition is a condition that a rotation operation meets.

To sum up, in an embodiment, a first operation is detected; a detection result of the first operation is processed; an instruction to be generated is determined by determining whether the detection result meets a first condition and a second condition; and the instruction is responded. A particular type of instruction to be generated is determined by determining whether the detection result meets the first condition and the second condition, so as to effectively avoid a misoperation of an electronic device supporting a rotatable function and a press function, improve user experience, and highlight functional diversity of the electronic device.

Figure 2:
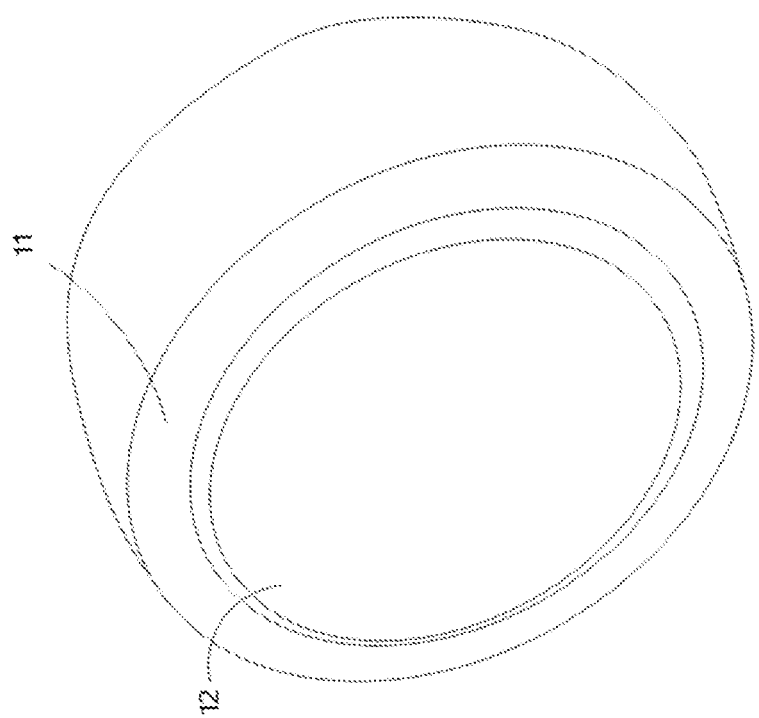
FIG. 2 is a schematic structural diagram of an exemplary electronic device.

An embodiment of the information processing method is applied to an electronic device. The electronic device is a device supporting a rotatable function and a press function. In this embodiment, the device supporting a rotatable function and a press function is of a round shape, or certainly, it may be of any other appropriate shape. As shown in FIG. 2, the electronic device includes at least a first body 11 and a second body 12. The second body 12 may be regarded as a display area of the electronic device. A rotation operation may be implemented on the electronic device by performing a clockwise/counterclockwise rotation movement on the first body 11. The rotation operation may be regarded as a rotation operation performed on the whole electronic device, or may be regarded as a rotation operation performed on content displayed in a display unit of the electronic device. A press operation may be implemented on the electronic device by pressing the first body 11 in the display unit. When detecting a rotation operation and/or a press operation, the electronic device may change a display interface in the display unit.

Figure 3:
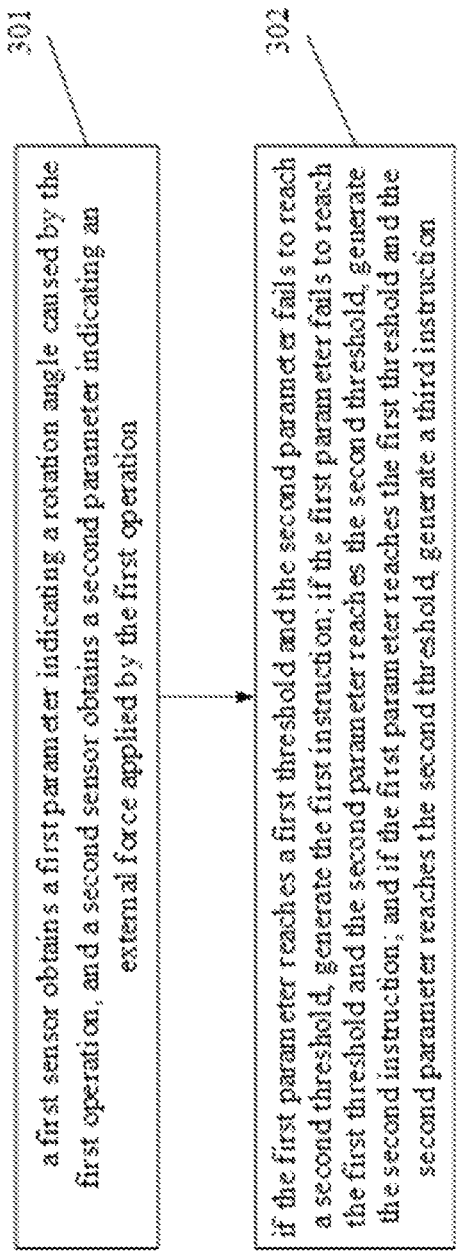
FIG. 3 is a schematic flow diagram of implementation of an exemplary embodiment of an information processing method.

FIG. 3 is a schematic flow diagram of implementation of an embodiment of an information processing method. As shown in FIG. 3, the method includes:

Step 301: A first sensor obtains a first parameter indicating a rotation angle caused by the first operation, and a second sensor obtains a second parameter indicating an external force applied by the first operation. Herein, the electronic device detects an operation, for example, an operation performed on the first body 11 by a user; the first sensor is configured to detect a rotation angle of the first body 11 caused by the first operation; and the second sensor is configured to detect an external force, for example, a pressure applied to the first body by the first operation.

Step 302: If the first parameter reaches a first threshold and the second parameter fails to reach a second threshold, generate the first instruction; if the first parameter fails to reach the first threshold and the second parameter reaches the second threshold, generate the second instruction; and if the first parameter reaches the first threshold and the second parameter reaches the second threshold, generate the third instruction.

Herein, the first condition is an allowed minimum rotation angle 'a' (the first threshold) of the first body that is subjected to a rotation operation, and the second condition is an allowed minimum external force 'b' (the second threshold) applied to the first body that is subjected to a press operation. A relationship between the first parameter and the first threshold and a relationship between the second parameter and the second threshold are determined. When it is determined that the first parameter reaches the first threshold and the second parameter fails to reach the second threshold, it indicates that a rotation angle of the first body caused by the first operation meets the first condition, but an external force applied to the first body by the first operation fails to meet the second condition. Therefore, it can be determined that the first operation is a rotation operation. A rotation instruction is generated and responded. When it is determined that the first parameter fails to reach the first threshold and the second parameter reaches the second threshold, it indicates that the rotation angle of the first body caused by the first operation fails to meet the first condition, but the external force applied to the first body by the first operation meets the second condition. Therefore, it can be determined that the first operation is a press operation. A press instruction is generated and responded. When it is determined that the first parameter reaches the first threshold and the second parameter reaches the second threshold, it indicates that the rotation angle of the first body caused by the first operation meets the first condition, and the external force applied to the first body meets the second condition. Therefore, it can be determined that the first operation is a rotation and press operation, that is, the first operation is a composite operation. A rotation and press instruction is generated and responded. The first threshold and the second threshold are flexibly set according to actual usage conditions, for example, the first threshold is 20°, and the second threshold is 3 N (Newton), and the like.

The third instruction, that is, the rotation and press instruction may further be considered as an instruction that is triggered by using a combination of at least one first instruction and at least one second instruction. The third instruction may be used as a shortcut instruction, which may be used to implement a shortcut operation on an electronic device, such as a selection operation and a confirmation operation. If the third instruction is an instruction that is triggered by using a combination of at least one first instruction and at least one second instruction, the combined instruction is triggered by the at least one first instruction and the at least one second instruction that are in a particular sequence. For example, a rotation instruction generated first+a press instruction generated later are used to return from a current interface of an electronic device to a home interface, and a press instruction generated first+a rotation instruction generated later are used to enter a browser interface from the current interface. Different sequences of instructions in the combined instruction represent different operations. Besides, the third instruction is used as a shortcut instruction, so as to avoid a problem of entering, by performing frequent press and rotation operations on the electronic device, a target display interface. For example, it is assumed that a user intends to enter a target display interface, that is, an interface C from a current display interface A, common operations are: first performing two rotation operations to enable an electronic device to enter a display interface B from the current display interface A, and then performing a press operation to enable the electronic device to enter the display interface C from the display interface B. In this embodiment, only one press operation and one rotation operation are required, so as to directly enter the display interface C from the display interface A. Therefore, directly entering the display interface C from the display interface A can be implemented, operations are relatively simple, and multiple rotations and multiple presses are not required, thereby effectively avoiding the problem of entering, by performing frequent press and rotation operations on an electronic device, a target display interface.

Figure 4:
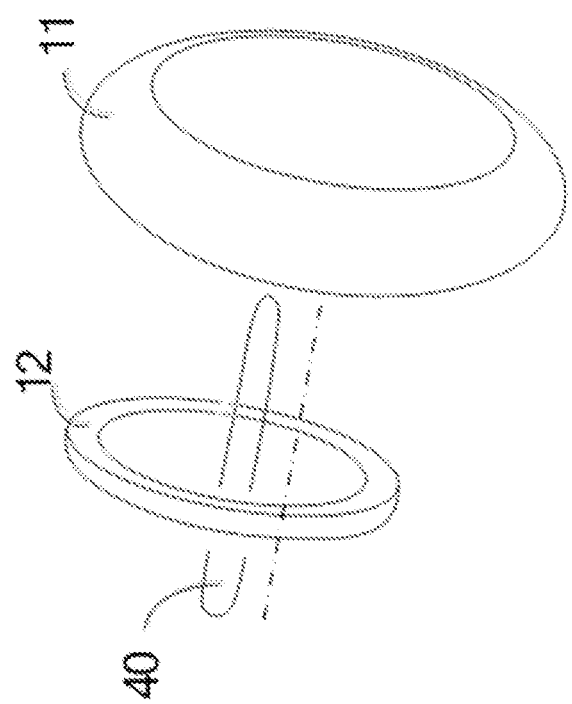
FIG. 4 is a schematic structural diagram of an exemplary electronic device.

In practical applications, the first body 11 and the second body 12 may be connected by using a connection apparatus, as shown in FIG. 4, the connection apparatus is a main axis, that is, a rotation shaft 40. One end of the rotation shaft 40 is connected to the second body 12, and the rotation shaft 40 may rotate relative to the second body 12. The other end of the rotation shaft 40 is securely connected to the first body 11. When the first body 11 is rotated, the first body 11 drives the rotation shaft 40 to rotate, thereby implementing rotation of the first body 11 relative to the second body 12. The first sensor is configured to detect an angle by which the first body rotates around the main axis, that is, the rotation shaft 40. When a user holds the first body 11 or uses a finger to enable the first body 11 to perform clockwise/counterclockwise rotation, that is, an angle by which the first body 11 rotates around a first preset direction reaches a first threshold, the first body 11 rotates relative to the second body 12. The first body 11 rotates around the first preset direction, that is, the first body 11 rotates around a direction of the main axis, and a direction of a first main axis is an axial direction of the rotation shaft 40, as shown in a dotted line in FIG. 4.

Figure 5:
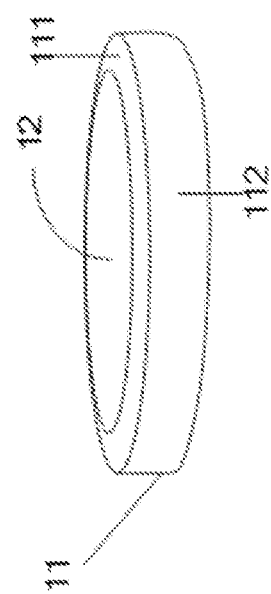
FIG. 5 is a schematic structural diagram of an exemplary electronic device.
Figure 6A:
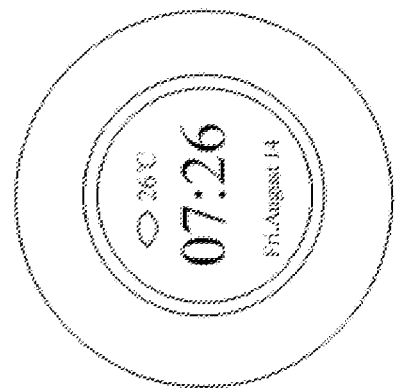
FIGS. 6(a)-6(d) are exemplary schematic diagrams showing switching between display interfaces of an electronic device.
Figure 6B:
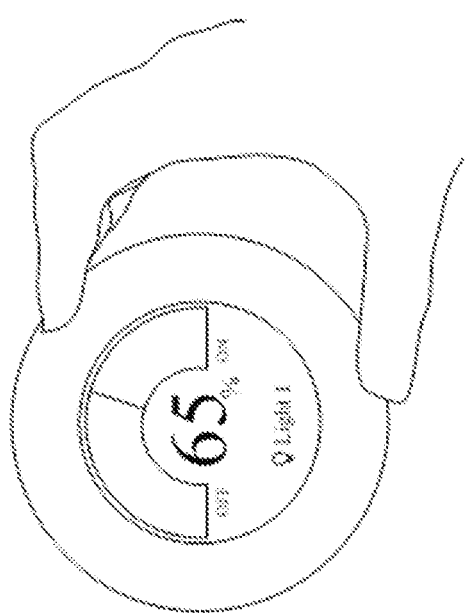
Figure 6C:
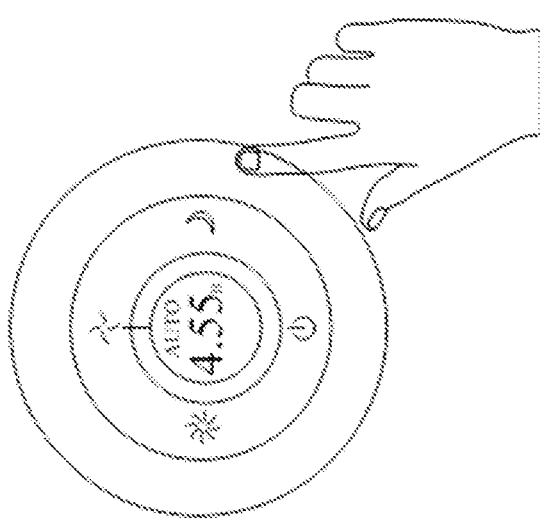
Figure 6D:
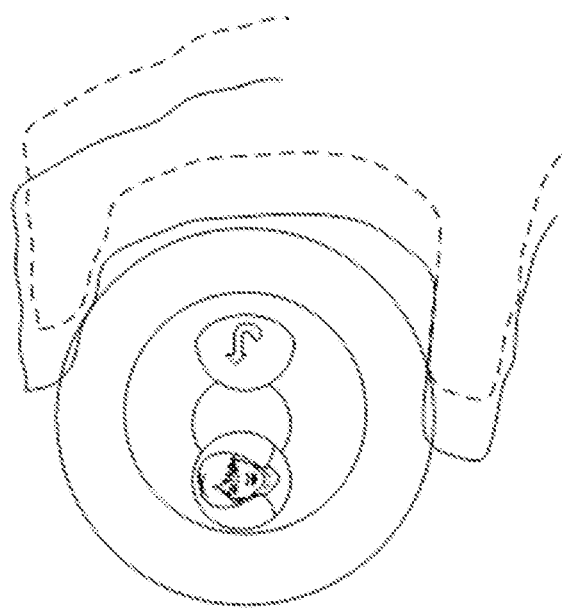

The first body 11 has a particular thickness, has a structure similar to a cyclic structure, a cylindrical structure, and the like, and has at least a first surface and a second surface. The first surface is an upper surface 111, and the second surface is a side surface 112. A press operation may be performed on the upper surface 111 of the first body 11, or may be performed on the side surface 112 of the first body 11, as shown in FIG. 5. If the press operation is performed on the upper surface 111 of the first body 11, and a user's finger is pressed on the upper surface 111, a direction of a pressure applied on the first body 11 by the press operation is perpendicular to the upper surface 111, that is, a direction parallel to the direction of the main axis. In this case, the second sensor may be disposed on the upper surface 111 or on the interior of the upper surface 111 of the first body 11. If the press operation is performed on the side surface 112 of the first body 11, and a user's finger is pressed on the side surface 112 or a user holds the electronic device by holding the side surface 112, a direction of a pressure applied by the press operation is a tangential direction of the side surface 112, that is, the direction of the applied pressure is perpendicular to the direction of the main axis. In this case, the second sensor may be disposed on the side surface 112 or on the interior of the side surface 112 of the first body 11. That is, the direction of the pressure applied to the first body 11 by the press operation may be the same as the direction of the main axis, or may be opposite to the direction of the main axis, which is determined by an operation area, such as the side surface 112 or the upper surface 111, of the press operation.

The first sensor may be disposed on the first surface or the second surface, or on the interior of the first/the second surface. Certainly, positions for disposing the first sensor and the second sensor may be other positions of the electronic device, as long as the rotation angle of the first body and the external force applied to the first body can be detected, but are not specifically limited in this embodiment. In this embodiment, the first sensor may be any sensor capable of detecting an angle, such as an angular transducer and a gyroscope, and the second sensor may be any sensor capable of detecting an applied external force, such as a pressure sensor, but are not specifically limited herein. This solution provides different operation areas for press operations of the user, so as to effectively improve user experience of the user and represent human centered properties of the operations.

In an embodiment, an operation type (a press operation, a rotation operation, and a press and rotation operation) of a first operation is determined by comparing a first parameter and a first threshold and comparing a second parameter and a second threshold, a corresponding instruction is generated according to the operation type, and the instruction is responded. The operation type of the first operation is determined through a rotation angle of a first body caused by the first operation, and an external force applied to the first body by the first operation, so as to effectively avoid a misoperation of an electronic device supporting a rotatable function and a press function, improve user experience, and highlight functional diversity of the electronic device.

In an embodiment, the responding to the first instruction includes: generating, on the basis of the first instruction, a first control instruction, and sending the first control instruction to a second device, so as to enable a change in a first property of the second device; the responding to the second instruction includes: generating, on the basis of the second instruction, a second control instruction, and sending the second control instruction to the second device, so as to enable a change in a second property of the second device; and the responding to the third instruction includes: generating, on the basis of the third instruction, a third control instruction, and sending the third control instruction to the second device, so as to enable a change in a third property of the second device, wherein the first property, the second property, and the third property are different from one another. That is, in the description, different properties of the same second device may be controlled. In a specific implementation process, the electronic device may be a remote control apparatus, and the generated first control instruction, second control instruction, and third control instruction are sent to another electronic device, such as the second device, for processing. For example, the electronic device may be an air conditioner remote control that has functions of controlling wind speed, temperature, and dehumidification. The first body 11 is used as a control knob disposed on the electronic device. When the control knob is only rotated, the first control instruction is generated, and the first control instruction is sent to the air conditioner, so as to control the wind speed of the air conditioner to be increased or decreased. When the control knob is only pressed, the second control instruction is generated, and the second control instruction is sent to the air conditioner, so as to enable the temperature of the air conditioner to be increased or decreased. When the control knob is simultaneously rotated and pressed, the third control instruction is generated, and the third control instruction is sent to the air conditioner, so as to control the dehumidification function of the air conditioner to be turned on or turned off.

In an embodiment, the responding to the first instruction includes: generating, on the basis of the first instruction, a first control instruction, and sending the first control instruction to a second device, so as to enable a change in a property of the second device; the responding to the second instruction includes: generating, on the basis of the second instruction, a second control instruction, and sending the second control instruction to a third device, so as to enable a change in a property of the third device; and the responding to the third instruction includes: generating, on the basis of the third instruction, a third control instruction, and sending the third control instruction to a fourth device, so as to enable a change in a property of the fourth device. That is, this electronic device can control different properties of different devices or a same property of different devices. For example, the electronic device may be a remote control that can control corresponding properties, for example, a switch, wind speed of an air conditioner, temperature of the air conditioner, output volume of a television, and cooling temperature of a refrigerator, of household appliances such as an air conditioner, a television, and a refrigerator. The first body 11 is used as a control knob disposed on the electronic device. When the control knob is only rotated, the first control instruction is generated, and the first control instruction is sent to the air conditioner (the second device), so as to control the wind speed of the air conditioner to be increased or decreased. When the control knob is only pressed, the second control instruction is generated, and the second control instruction is sent to the television (the third device), so as to enable the output volume of the television to be increased or decreased. When the control knob is simultaneously rotated and pressed, the third control instruction is generated, and the third control instruction is sent to the refrigerator (the fourth device), so as to control the cooling temperature of the refrigerator to be decreased or increased.

In an embodiment, a first display interface is acquired when the first operation is acquired; accordingly, the responding to the first instruction includes: switching from the first display interface to a second display interface; the responding to the second instruction includes: switching from the first display interface to a third display interface; and the responding to the third instruction includes: switching from the first display interface to a fourth display interface, wherein the second display interface, the third display interface, and the fourth display interface are different from one another.

With regard to the electronic device shown in FIG. 2, the second body 12 may be used as a display unit of the electronic device. When the electronic device detects the first operation, the display unit of the electronic device displays a home interface, as shown in FIG. 6(*a*), and displays content such as a date, a time, and a temperature. The first body 11 is used as a control knob disposed on the electronic device. When the control knob is only rotated, the first instruction is generated, so as to switch a display interface from the original home interface to a light brightness adjustment interface, as shown in FIG. 6(*b*), wherein a display interface whose light brightness is adjusted to 65%. When the control knob is only pressed, the second instruction is generated, so as to switch the display interface from the original home interface to a setting interface, as shown in FIG. 6(*c*), an air purifier is set to a turned off mode (a power off icon), a sleep mode (a moon icon), a turned on mode (a first snowflake icon, e.g. an icon of more snowflakes), or a rapid purification mode (a second snowflake icon, e.g. an icon of less snowflakes). When the control knob is rotated and pressed, the third instruction is generated, so as to switch the display interface from the original home interface to a music player interface, as shown in FIG. 6(*d*). That is, the rotation operation, the press operation, and the rotation and press operation, as several operation types of the electronic device, can switch display interfaces, and after the operations of the several operation types are performed, the display interfaces obtained after switching are different. Certainly, it may be set that switching from three different display interfaces to a same display interface is implemented by using the different types of operations, or it may be set that switching from a same display interface to another same display interface may be implemented by using the different types of operations, which can be flexibly set according to actual usage situations.

It should be noted that with regard to the first operation being a rotation and press operation, the operation may be implemented in a manner that a left/right hand of a user performs clockwise/counterclockwise rotation on the first body, and a right/left hand presses the first body. Alternatively, a left/right hand of a user performs clockwise/counterclockwise rotation on the first body while retaining the left/right hand, so as to press the first body while performing the clockwise/counterclockwise rotation on the first body, as shown in a gesture solid line-dotted line in FIG. 6(*d*).

Figure 7:
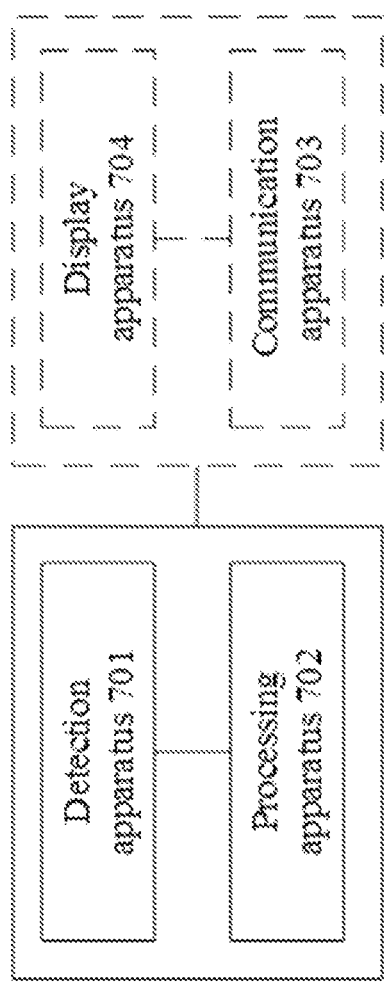
FIG. 7 is a schematic diagram of exemplary hardware compositions of an electronic device.

In an embodiment an electronic device is a device supporting a rotatable function and a press function. As shown in FIG. 7, the electronic device includes: a detection apparatus 701 and a processing apparatus 702, wherein the detection apparatus 701 is configured to detect a first operation, so as to obtain a detection result; and the processing apparatus 702 is configured to process the detection result; if the detection result indicates that the first operation meets a first, but not a second condition, a first instruction is generated and responded; if the detection result indicates that the first operation meets the second, but not the first condition, a second instruction is generated and responded; and if the detection result indicates that the first operation meets the first and the second conditions, a third instruction is generated and responded.

The detection apparatus 701 includes at least a first sensor and a second sensor, wherein obtaining, by a first sensor, a first parameter indicating a rotation angle caused by the first operation; and obtaining, by a second sensor, a second parameter indicating an external force applied by the first operation.

the first sensor is configured to detect an angle of a first body rotating, driven by the first operation, around a main axis; the first body includes at least a first surface and a second surface, and the first sensor is disposed on the first surface or the second surface; a direction of an external force applied to the first surface by the first operation is the same as a direction of the main axis, and the second sensor is disposed on the first surface or an inner surface of the first surface; or a direction of an external force applied to the second surface by the first operation is perpendicular to the direction of the main axis, and the second sensor is disposed on the second surface or an inner surface of the second surface. Please refer to relevant description of FIG. 5 for details, as the details will not repeated herein.

The processing apparatus 702 is configured to determine if the first parameter reaches a first threshold and the second parameter fails to reach a second threshold, the first instruction is generated; if the first parameter fails to reach the first threshold and the second parameter reaches the second threshold, the second instruction is generated; and if the first parameter reaches the first threshold and the second parameter reaches the second threshold, the third instruction is generated.

The electronic device further includes a communication apparatus 703 and a display apparatus 704, where the processing apparatus 702 generates a first control instruction on the basis of the first instruction, and accordingly, the communication apparatus 703 sends the first control instruction to a second device, so as to enable a change in a first property of the second device; the processing apparatus 702 generates a second control instruction on the basis of the second instruction, and accordingly, the communication apparatus 703 sends the second control instruction to the second device, so as to enable a change in a second property of the second device; and the processing apparatus 702 generates a third control instruction on the basis of the third instruction, and accordingly, the communication apparatus 703 sends the third control instruction to the second device, so as to enable a change in a third property of the second device.

Besides, the processing apparatus 702 generates a first control instruction on the basis of the first instruction, and accordingly, the communication apparatus 703 sends the first control instruction to a second device, so as to enable a change in a property of the second device; the processing apparatus 702 generates a second control instruction on the basis of the second instruction, and accordingly, the communication apparatus 703 sends the second control instruction to a third device, so as to enable a change in a property of the third device; and the processing apparatus 702 generates a third control instruction on the basis of the third instruction, and accordingly, the communication apparatus 703 sends the third control instruction to a fourth device, so as to enable a change in a property of the fourth device.

In an embodiment, the detection apparatus 701 is configured to acquire a first display interface when detecting the first operation; accordingly, the display apparatus 704 switches from the first display interface to a second display interface for display, or switches from the first display interface to a third display interface for display, or switches from the first display interface to a fourth display interface for display, wherein the second display interface, the third display interface, and the fourth display interface are different from one another.

The processing apparatus 702 may be implemented by a Central Processing Unit (CPU), a Digital Signal Processor (DSP), a Micro Processor Unit (MPU), or a Field Programmable Gate Array (FPGA) and the like. The display apparatus 704 may be a display screen; and the communication apparatus 703 may be a transmission module such as a baseband or a radio frequency, but are not specifically limited herein.

It should be noted that, with regard to the above-mentioned electronic device provided by the embodiments of the present invention, because a principle for resolving a problem by the electronic device is similar to that of the above-mentioned information processing method, description of an implementation process and an implementation principle of the electronic device may be obtained by referring to description of an implementation process and an implementation principle of the above-mentioned information processing method, therefore repeated details are not described herein.

Figure 8:
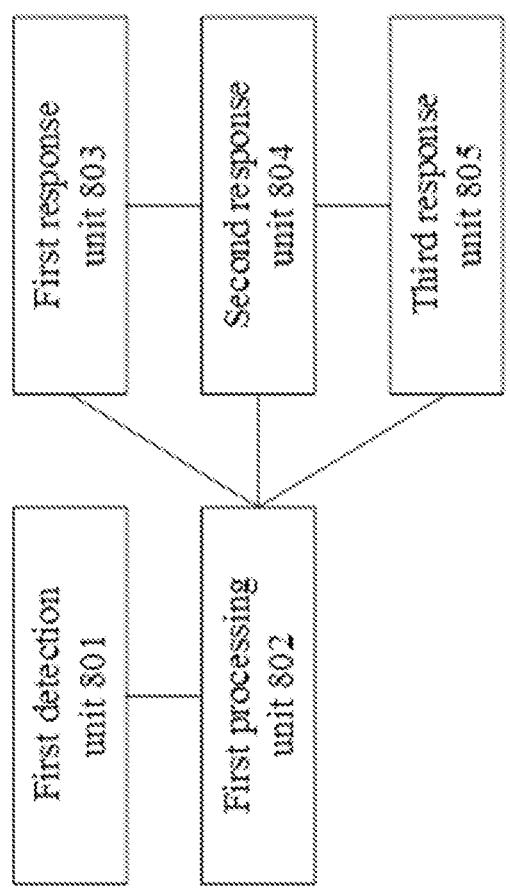
FIG. 8 is a schematic structural diagram of compositions of an exemplary embodiment of an electronic device.

The present invention provides an embodiment of an electronic device, and the electronic device is a device supporting a rotatable function and a press function. As shown in FIG. 8, the electronic device includes:

a first detection unit 801, that detects a first operation to obtain a detection result;

a first processing unit 802, that processes the detection result;

a first response unit 803, that generates a first instruction and respond to the first instruction if the detection result indicates that the first operation meets a first, but not a second condition;

a second response unit 804, that generates a second instruction and responds to the second instruction if the detection result indicates that the first operation meets the second, but not the first condition; and a third response unit 805, that generates a third instruction and responds to the third instruction if the detection result indicates that the first operation meets the first and the second conditions.

The first detection unit 801 obtains, by using a first sensor, a first parameter indicating a rotation angle caused by the first operation, and obtains, by using a second sensor, a second parameter indicating an external force applied by the first operation.

The first processing unit 802 is configured to trigger the first response unit 803 when determining that the first parameter reaches a first threshold and the second parameter fails to reach the second threshold, and the first response unit 803 generates the first instruction;

the first processing unit 802 triggers the second response unit 804 when determining that the first parameter fails to reach the first threshold and the second parameter reaches the second threshold, and the second response unit 804 generates the second instruction; and the first processing unit 802 triggers the third response unit 805 when determining that the first parameter reaches the first threshold and the second parameter reaches the second threshold, and the third response unit 805 generates the third instruction. The third instruction is an instruction that can be triggered by a combination of at least one first instruction and at least one second instruction.

The first sensor of the first detection unit 801 detects an operation of rotating around a main axis; the rotation angle is an angle of rotation around the main axis; and a direction of the external force is the same as a direction of the main axis, or is perpendicular to the direction of the main axis.

The electronic device further includes a communication unit and a display unit, wherein the first response unit 803 generates a first control instruction on the basis of the first instruction, and accordingly, the communication unit sends the first control instruction to a second device, so as to enable a change in a first property of the second device;

the second response unit 804 generates a second control instruction on the basis of the second instruction, and accordingly, the communication unit sends the second control instruction to the second device, so as to enable a change in a second property of the second device; and the third response unit 805 generates a third control instruction on the basis of the third instruction, and accordingly, the communication unit sends the third control instruction to the second device, so as to enable a change in a third property of the second device. The first property, the second property, and the third property are different from one another.

The first response unit 803 generates a first control instruction on the basis of the first instruction, and accordingly, the communication unit sends the first control instruction to a second device, so as to enable a change in a property of the second device;

the second response unit 804 generates a second control instruction on the basis of the second instruction, and accordingly, the communication unit sends the second control instruction to a third device, so as to enable a change in a property of the third device; and the third response unit 805 generates a third control instruction on the basis of the third instruction, and accordingly, the communication unit sends the third control instruction to a fourth device, so as to enable a change in a property of the fourth device.

The first detection unit 801 acquires a first display interface when acquiring the first operation;

the first response unit 803 switches from the first display interface to a second display interface, and the display unit displays the second display interface;

the second response unit 804 switches from the first display interface to a third display interface, and the display unit displays the third display interface; and the third response unit 805 switches from the first display interface to a fourth display interface, and the display unit displays the fourth display interface, wherein the second display interface, the third display interface, and the fourth display interface are different from one another.

It should be noted that, with regard to the above-mentioned electronic device provided by an embodiment, because a principle for resolving a problem by the electronic device is similar to that of the above-mentioned information processing method, description of an implementation process and an implementation principle of the electronic device may be obtained by referring to description of an implementation process and an implementation principle of the above-mentioned information processing method, therefore repeated details are not described herein.

In the above embodiments of the information processing method and the electronic device provided by the present invention, the involved electronic device may be a remote control apparatus of other devices such as an air conditioner, a refrigerator, and a television, or may be an independent device such as various types of computers such as an industrial personal computer and a personal computer, an all-in-one computer, a tablet computer, a cellphone, and an e-reader, or may be a wearable device such as smart glasses, a smart watch, and smart shoes.

Those skilled in the art should understand that the embodiments of the present invention may be provided as a method, a system, or a computer program product. Therefore, the present invention can adopt a form of a hardware embodiment, a software embodiment, or an embodiment combining software and hardware. Moreover, the present invention may adopt a form of a computer program product implemented in one or more computer usable storage media (including, but not limited to, a magnetic disk memory, an optical memory, and the like) containing computer usable program codes. In the context of this document, a storage media is not a signal and "non-transitory" includes all media except signal media.

The present invention is described with reference to flow diagrams and/or block diagrams of methods, devices (systems), and computer program products according to embodiments of the present invention. It should be understood that, each process and/or block in the flow diagrams and/or block diagrams and a combination of processes and/or blocks in the flow diagrams and/or block diagrams may be implemented by using computer program instructions. The computer program instructions may be provided to a general computer, a dedicated computer, an embedded processor, or a processor of another programmable data processing device to generate a machine, so that the instructions executed by the computer or the processor of another programmable data processing device generates an apparatus configured to implement functions designated in one or more processes in the flow diagrams and/or one or more blocks in the block diagrams.

The computer program instructions may also be stored in a computer readable memory that can guide the computer or other programmable data processing device to work in a specific manner, so that the instruction stored in the computer readable memory generates a product including an instruction apparatus, and the instruction apparatus implements functions designated in one or more processes in the flow diagrams and/or one or more blocks in the block diagrams.

The computer program instructions may also be loaded to the computer or other programmable data processing devices, so that a series of operational steps are executed on the computer or other programmable devices to generate computer implemented processing, and therefore, instructions executed on the computer or other programmable devices provide steps used to implement functions designated in one or more processes in the flow diagrams and/or one or more blocks in the block diagrams.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

The invention claimed is:

1. An electronic device, comprising:
a first main body;
a second main body being moveable relative to the first main body;
a first sensing apparatus that is configured to obtain a first parameter in response to the second main body moving relative to the first main body to satisfy a first condition, wherein the first parameter corresponds to a degree of rotation and wherein the first condition corresponds to a predetermined degree of rotation;
a second sensing apparatus that is configured to obtain a second parameter in response to the first or the second main body receiving a second operation satisfying a second condition, wherein the second parameter corresponds to an external force value, wherein the second operation corresponds to an external force, and wherein the second condition corresponds to a predetermined external force value;
wherein the second operation is received during a duration of the second main body moving relative to the first main body; and
a processing apparatus that is configured to:
provide a first instruction to a first device to perform a climate adjustment function responsive to identifying that the first condition is satisfied before the second condition; and
provide a second instruction, different from the first instruction, to a second device to perform a media adjustment function responsive to identifying that the second condition is satisfied before the first condition.

2. The electronic device according to claim 1, further comprising:
a rotation mechanism by which the first main body and the second main body are connected such that the second main body is able to rotate relative to the first main body;
wherein the first sensing apparatus is configured to obtain the first parameter for characterizing a motion state of the second main body in response to the second main body rotating relative to the first main body;
wherein the second sensing apparatus is configured to obtain the second parameter for characterizing a pressed state in response to the second main body receiving a pressing operation.

3. The electronic device according to claim 2, wherein:
the second sensing apparatus comprises a capacitor that is configured to obtain a capacitance value corresponding to an external force;
the processing apparatus is configured to determine that the external force satisfies the second condition; and
the processor is configured to determine that the capacitance value satisfies a preset range of the capacitance values to generate the instruction.

4. The electronic device according to claim 1, wherein the electronic device further comprises:
a display apparatus configured to show at least one display content;
wherein the processing apparatus is configured to determine a second display content based on a motion direction contained in the first parameter and related to a motion direction of the second main body, such that the display apparatus is configured to show the second display content.

5. The electronic device according to claim 1, wherein:
the second sensing apparatus comprises at least one sheet structure that can be in a first pressed state or a second, un-pressed state based on an external force;
the at least one sheet structure being in the first state in the event that the external force satisfies the second condition; and
the processing apparatus being configured to generate the instruction in the event the at least one sheet structure is in the first state.

6. A method, comprising:
obtaining, with a first sensing apparatus, a first parameter in response to a first main body of a device moving relative to a second main body of the device to satisfy a first condition, wherein the first parameter corresponds to a degree of rotation and wherein the first condition corresponds to a predetermined degree of rotation;
obtaining, with a second sensing apparatus, a second parameter in response to the first or the second main body receiving a second operation satisfying a second condition, wherein the second parameter corresponds to an external force value, wherein the second operation corresponds to an external force, and wherein the second condition corresponds to a predetermined external force value; and
providing, with a processing apparatus, a first instruction to a first device to perform a climate adjustment function responsive to identifying that the first condition is satisfied before the second condition and providing a second instruction, different from the first instruction, to a second device to perform a media adjustment function responsive to identifying that the second condition is satisfied before the first condition;
wherein the second operation is received during a duration of the second main body moving relative to the first main body.

7. The method according to claim 6, wherein:
the first sensing apparatus obtains the first parameter for characterizing a motion state of the second main body in response to the second main body rotating relative to the first main body;
the second sensing apparatus obtains the second parameter for characterizing a pressed state in response to the second main body receiving a pressing operation.

8. The method according to claim 7, wherein:
the second sensing apparatus comprises a capacitor that obtains a capacitance value corresponding to an external force;
the processing apparatus determines that the external force satisfies the second condition; and
the processor determines that the capacitance value satisfies a preset range of the capacitance values to generate the instruction.

9. The method according to claim 6, further comprising:
showing, on a display apparatus, at least one display content;
determining, with the processing apparatus, a second display content based on a motion direction contained in the first parameter and related to a motion direction of the second main body; and
thereafter displaying, with the display apparatus, the second display content.

10. A control device, comprising:
an electronic device, comprising:
a first main body;
a second main body being moveable relative to the first main body;
a first sensing apparatus that is configured to obtain a first parameter in response to the second main body moving relative to the first main body to satisfy a first condition, wherein the first parameter corresponds to a degree of rotation and wherein the first condition corresponds to a predetermined degree of rotation;
a second sensing apparatus that is configured to obtain a second parameter in response to the first or the second main body receiving a second operation satisfying a second condition, wherein the second parameter corresponds to an external force value, wherein the second operation corresponds to an external force, and wherein the second condition corresponds to a predetermined external force value;
wherein the second operation is received during a duration of the second main body moving relative to the first main body; and
a processing apparatus that is configured to:
provide a first instruction to a first device to perform a climate adjustment function responsive to identifying that the first condition is satisfied before the second condition; and
provide a second instruction, different from the first instruction, to a second device to perform a media adjustment function responsive to identifying that the second condition is satisfied before the first condition.

* * * * *